United States Patent [19]
Freitag et al.

[11] Patent Number: 6,105,271
[45] Date of Patent: *Aug. 22, 2000

[54] ARRANGEMENT FOR ACCOMMODATING A SCALE IN A POSITIVE ENGAGEMENT

[75] Inventors: Hans-Joachim Freitag; Ludwig Boege, both of Jena, Germany

[73] Assignee: Johannes Heidenhain GmbH, Traunreut, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,032

[22] PCT Filed: Jul. 19, 1996

[86] PCT No.: PCT/EP96/03196

§ 371 Date: Mar. 19, 1997

§ 102(e) Date: Mar. 19, 1997

[87] PCT Pub. No.: WO97/04287

PCT Pub. Date: Feb. 6, 1997

[30] Foreign Application Priority Data

Jul. 20, 1995 [DE] Germany ............................ 195 26 518

[51] Int. Cl.[7] .............................. G01B 3/10; G01B 21/00
[52] U.S. Cl. .................................. 33/706; 33/732; 33/759
[58] Field of Search ............................. 33/706, 732, 733, 33/759, 707, 708, 710, 703, 704, 755, 771, 561.2, 555.4

[56] References Cited

U.S. PATENT DOCUMENTS

| 407,756 | 7/1889 | Williams | 33/561.2 |
|---|---|---|---|
| 2,191,808 | 2/1940 | Schramm | 40/665 |
| 3,134,176 | 5/1964 | Hoyle | 33/561.2 |
| 3,724,083 | 4/1973 | Mehl | 33/561.2 |
| 4,479,629 | 10/1984 | Funatsu | 249/53 R |
| 4,747,215 | 5/1988 | Waikas | 33/763 |
| 4,936,023 | 6/1990 | Pechak | 33/706 |
| 4,982,508 | 1/1991 | Nelle et al. | 33/502 |
| 5,063,685 | 11/1991 | Morrison et al. | 33/701 |
| 5,063,686 | 11/1991 | Peloquin | 33/757 |
| 5,182,867 | 2/1993 | Nelle | 33/502 |
| 5,406,715 | 4/1995 | Koizumi et al. | 33/706 |
| 5,628,120 | 5/1997 | Sergenius | 33/763 |

FOREIGN PATENT DOCUMENTS

| 0 314 940 | 5/1989 | European Pat. Off. . |
|---|---|---|
| 34 27 027 | 4/1985 | Germany . |

*Primary Examiner*—Andrew H. Hirshfeld
*Assistant Examiner*—R. Alexander Smith
*Attorney, Agent, or Firm*—Brown & Wood, LLP

[57] ABSTRACT

An arrangement for accommodating a scale (2) of a length measuring device in a positive-locking engagement has a profile base (1) and lateral profile legs (4, 5) which are connected with the profile base so as to project away from it. A scale (2) is arranged between the profile legs (4; 5). The profile legs (4; 5) are made of elastic material and the profile base (1) is made of a longitudinally stable, bendable material. The profile legs (4; 5) can contain elastic sealing slats.

18 Claims, 2 Drawing Sheets

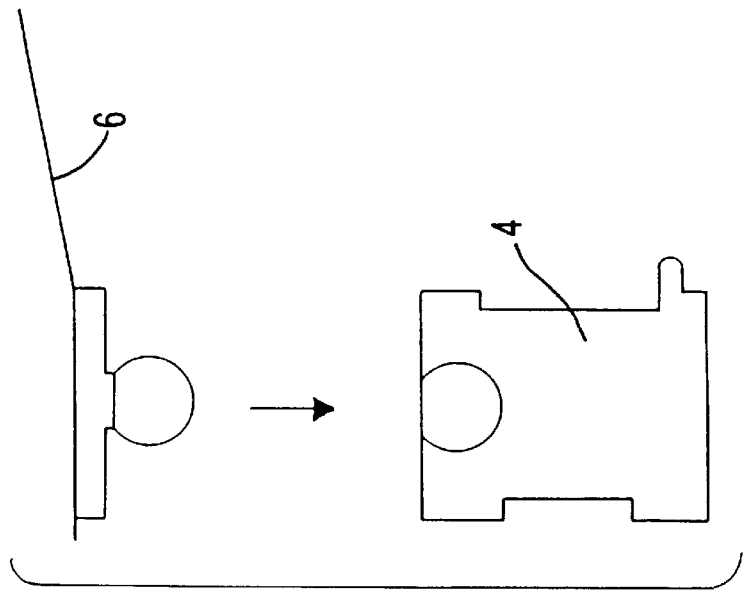
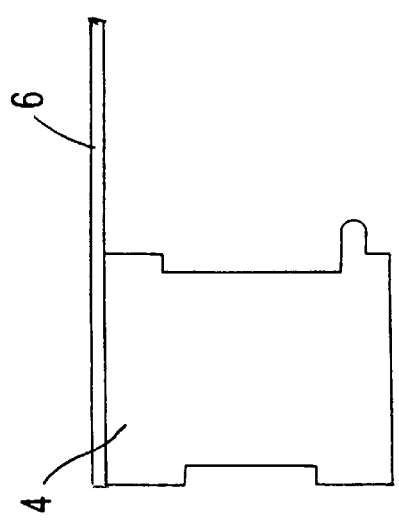
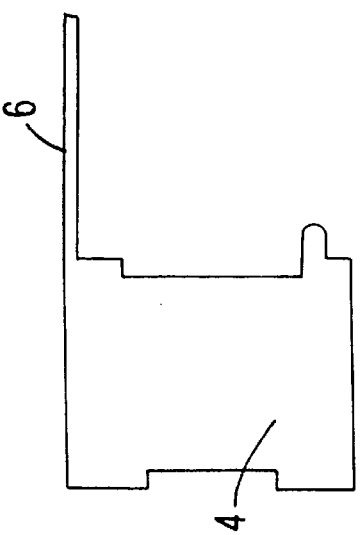

ARRANGEMENT FOR ACCOMMODATING A SCALE IN A POSITIVE ENGAGEMENT

BACKGROUND OF THE INVENTION

1. Field of the Invention

The invention is directed to an arrangement for receiving or accommodating a scale in an interlocking or positive-locking engagement and can be used, for example, for measuring devices in machine construction.

2. Description of the Related Art

Numerous measurement devices are known from the prior art in which the scale is accommodated in an elongated hollow body (DE-C-25 05 587). In this case, the scale is generally connected with a hollow body by the intermediary of a resilient intermediate layer. The hollow bodies are made from light metal, preferably aluminum.

In a great many constructions, especially for large measurement lengths, a graduated steel strip is used as a scale. This graduated strip is accommodated in grooves or folds of the support body. A configuration of this kind in which the base or support body is constructed as a supporting hollow profile is known from DE-C-27 12 421.

Devices for measuring extensive lengths are realized in such a way that portions of the support body which are advantageous with respect to length are aligned and fixed on a machine component, wherein it is known in general to arrange elastic seals between the individual portions in order to compensate for thermal expansion. After the portion of the support body has been mounted, the measurement strip is drawn into the groove of the support body and fastened. A corresponding practical construction with a measurement strip support is known from the company brochure "NC Linear Encoders", July 1994, published by the Heidenhain company. In this case, individual measurement strip support portions must be aligned on the machine component and fastened by screws for extensive measurement lengths.

All of these constructions have the disadvantage that the scale support must be fastened and aligned on the machine component in a cumbersome assembling process which is very costly for extensive lengths.

OBJECT AND SUMMARY OF THE INVENTION

The primary object of the invention is to provide an arrangement in which a scale is held in a positive engagement such that the mounting of the scale support, e.g., on a machine tool, also for large measurement lengths, is achieved economically with respect to time and effort.

This object is met in accordance with the invention in an arrangement of the generic type for accommodating a measurement scale in a positive engagement in that the profile legs are made of elastic or flexible material and the profile base is formed of a longitudinally stable, bendable material.

In accordance with a preferred embodiment of the invention, the longitudinally stable, bendable material is a metal strip.

In an advantageous further development of the invention, the profile legs contain elastic sealing lamellae or sealing slats.

The profile legs are advantageously connected with the profile base by self-adhesive foil.

The profile legs and the profile base are advantageously enclosed by elastic sealing slats.

A simple and economical mounting of a scale body formed of a scale and profile base on a machine tool is achieved by means of the solution according to the invention. Beyond this, the solution according to the invention enables efficient transport, also for purposes of servicing, since the scale body can be wound up in the case of extensive measurement lengths.

The invention will be described more fully in the following with reference to a schematic drawing.

BRIEF DESCRIPTION OF THE DRAWINGS

FIGS. 2a), 2b), 2c) show additional embodiment forms of the arrangement according to the invention.

DESCRIPTION OF THE PREFERRED EMBODIMENTS

Figure 1:
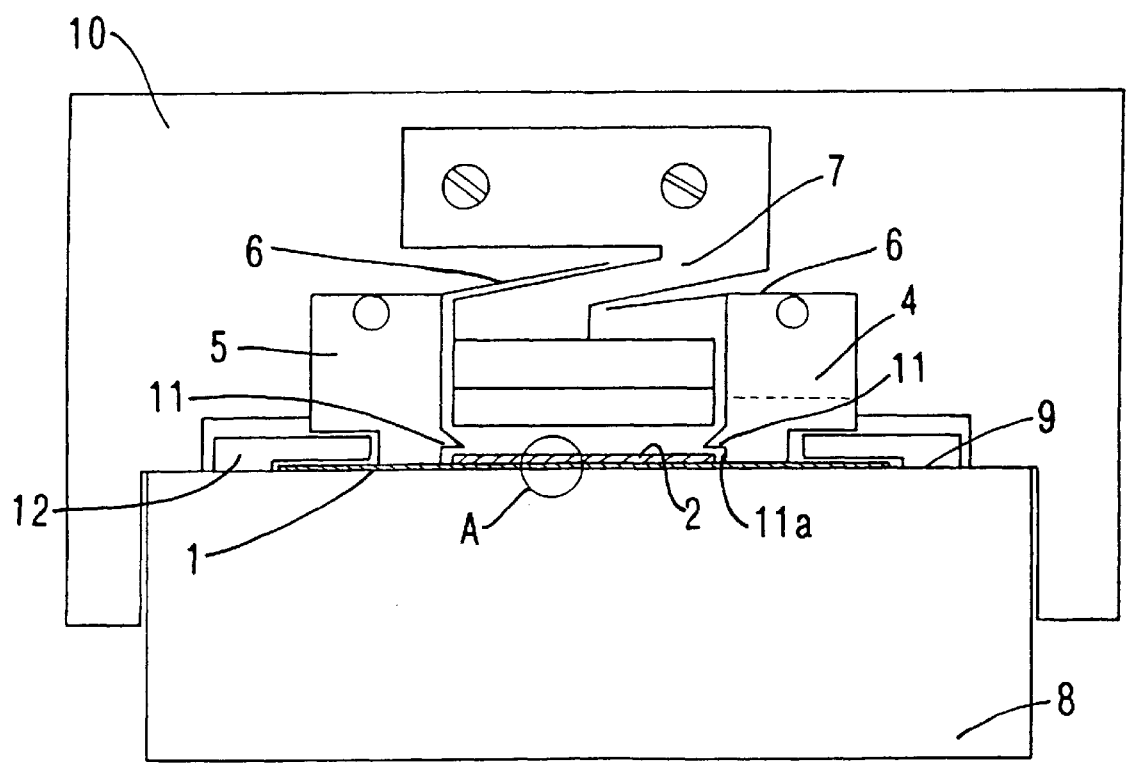
FIG. 1 shows a schematic illustration of the arrangement according to the invention.
Figure 1A:
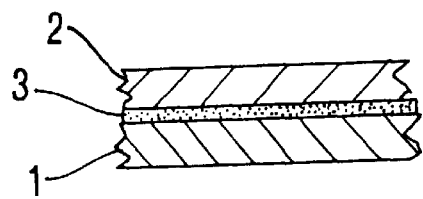

In the arrangement which is shown schematically in FIG. 1, a scale 2, e.g., a graduated steel rule, is arranged on a profile base 1 made, for example, from steel. The scale 2 can be constructed, with or without an intermediate layer 3, as an elastic adhesive layer or an oil film resting on the profile base 1. The profile base 1 can be made of a metal strip, for instance. Two profile legs 4, 5 which are made from elastic material, e.g., polyurethane, are arranged laterally of the scale 2 along its length in the longitudinal direction. The profile legs 4, 5 are fastened to the profile base 1 by means of conventional connection techniques, e.g., by gluing, vulcanizing, spraying, etc., or by means of self-adhesive foil.

The material of which the profile legs 4, 5 and profile base 1 are fabricated should preferably have a stiffness enabling them to be wound upon a base body with a radius r of 20–40 cm diameter, for example. The sensing unit 7 is shown schematically. The sensing unit 7, which is normally connected with a slide 10 ensuring the guidance of the measurement device, slides in two elastic sealing slats 6 arranged in the longitudinal direction. The scale 2 and the sensor of the sensing unit 7 are thus protected from harmful environmental influences. Since the scale 2 is uncoupled flexibly from the base body in small areas and the profile legs and profile base bend easily, this arrangement can be wound up in its entirety, especially when used for large measurement lengths, and advantageously transported. In order to install or remove the overall arrangement in or on a machine component 8 with a plane receiving surface 9, the system need only be unrolled, inserted in the longitudinal direction in recesses 12 which are formed, for instance, as grooves or folds, and fixed therein.

The folds 11 arranged laterally at the profile legs and defining recesses 11a ensure that the scale 2 will be held in a positive engagement so as to be substantially free of play.

A spatially defined, rigid gluing or locking, not shown, forms a fixed assignment of position as a fixed point between the scale 2 and the profile base.

This fixed point is preferably selected in such a way that it coincides with the zero point or origin, not shown, of the machine coordinate system. The profile base 1 is likewise fixedly connected with the machine component 8 at this fixed point.

The lateral and vertical accommodation and orientation of the scale 2 can be realized by means of recesses formed in the elastic profile legs 4, 5.

FIGS. 2a) and 2b) contain embodiment forms for the configuration of the elastic profile legs 4, 5 with the sealing slats 6.

It will be seen from the embodiment forms in 2a) and 2c) that the elastic profile leg 4 and the sealing slat 6 are formed from one part in 2c), whereas in 2a) the sealing slat 6 is arranged on or at the elastic profile leg 4 by conventional connecting techniques, e.g., by gluing.

FIG. 2b) shows an advantageous construction of the invention in which the sealing slat 6 can be locked with the elastic profile leg 4 via a pressure-type locking.

The elastic profile legs 5 have the same construction as the profile legs 4, 5 and sealing slats 6 arranged in FIG. 1.

While the foregoing description and drawings represent the preferred embodiments of the present invention, it will be obvious to those skilled in the art that various changes and modifications may be made therein without departing from the true spirit and scope of the present invention.

What is claimed is:

1. A length measuring device, comprising a scale; a profile base for supporting the scale; lateral profile legs connected with the profile base and projecting away therefrom for accommodating the scale on the profile base; and a space,
   wherein the profile base is formed of a longitudinally stable and bendable metal strip;
   wherein the lateral profile legs are made of an elastic material;
   wherein the scale and the space are arranged between the profile legs;
   the space having a depth comprising a majority portion of a height of the lateral profile legs from the profile base; and
   wherein both the metal strip and the elastic material have a stiffness enabling the profile legs and the profile base to be wound up.

2. The length measuring device according to claim 1, wherein both the metal strip and the elastic material have a stiffness enabling said profile legs and said profile base to be wound upon a base body with a radius of 20–40 cm.

3. The length measuring device according to claim 1, wherein the scale is a graduated steel rule.

4. The length measuring device according to claim 1, wherein the scale is mounted on the profile base by an adhesive layer.

5. The length measuring device according to claim 1, wherein the scale is rested on the profile base with an intermediate oil film.

6. The length measuring device according to claim 1, wherein said profile legs are connected to said profile base by self-adhesive foil.

7. The length measuring device according to claim 1, wherein said profile legs have a holding means for holding said scale in a positive engagement on said profile base wherein said holding means are folds.

8. The length measuring device according to claim 1, wherein said profile legs have a holding means for holding said scale in a positive engagement on said profile base, wherein said holding means are recesses formed in said elastic profile legs.

9. The length measuring device according to claim 1, wherein each said profile legs contains an elastic sealing slat for protecting said scale and a sensor of a sensing unit from environmental influences.

10. The length measuring device according to claim 9, wherein each said profile leg and said corresponding sealing slat are formed from one part.

11. The length measuring device according to claim 1, wherein said profile legs are connected with said profile base by a self-adhesive foil.

12. The length measuring device according to claim 1, wherein the scale is inserted, in a longitudinal direction, in recesses formed by respective folds of the profile legs.

13. In a length measuring device including a scale; a profile base for supporting the scale; lateral profile legs connected with the profile base and projecting away therefrom for accommodating the scale on the profile base; and a space, wherein the scale and the space are arranged between the profile legs, the space having a depth comprising a majority portion of a height of the lateral profile legs from the profile base, the improvement comprising forming the profile legs of an elastic material and forming the profile base of a longitudinally stable and bendable metal strip, both the elastic material and the metal strip having a stiffness enabling the profile legs and the profile base to be wound upon a base body with a radius of 20–40 cm, and the profile legs forming laterally arranged means for holding the scale in a positive locking engagement with the profile base.

14. The improvement according to claim 13, wherein said scale is a graduated steel rule.

15. The improvement according to claim 13, wherein said scale is mounted on said profile base by an adhesive layer.

16. The improvement according to claim 13, wherein said scale is rested on said profile base with an intermediate oil firm.

17. An arrangement, comprising a machine component having a plane receiving surface; and a length measuring device mounted on the receiving surface of the machine component, the length measuring device including a scale; a profile base for supporting the scale; lateral profile legs connected with the profile base and projecting away therefrom for accommodating the scale on the profile base; and a space, wherein the profile base is formed of a longitudinally stable and bendable metal strip; wherein the lateral profile legs are made of an elastic material; wherein the scale and the space are arranged between the profile legs; wherein the space has a depth comprising a majority portion of a height of the lateral profile legs from the profile base; and
   wherein both the metal strip and the elastic material have a stiffness enabling the profile legs and the profile base to be wound up.

18. An arrangement according to claim 17, wherein the machine component has recesses extending in a longitudinal direction for receiving the profile base, the length measuring device being unrolled before insertion of the profile base in the recesses.

* * * * *